June 13, 1967 E. DOMEIER ET AL 3,324,848
CAPACITANCE RESPIROMETER
Filed Jan. 10, 1964 3 Sheets-Sheet 1
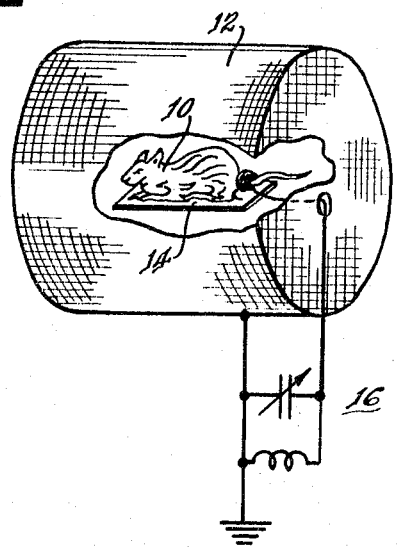
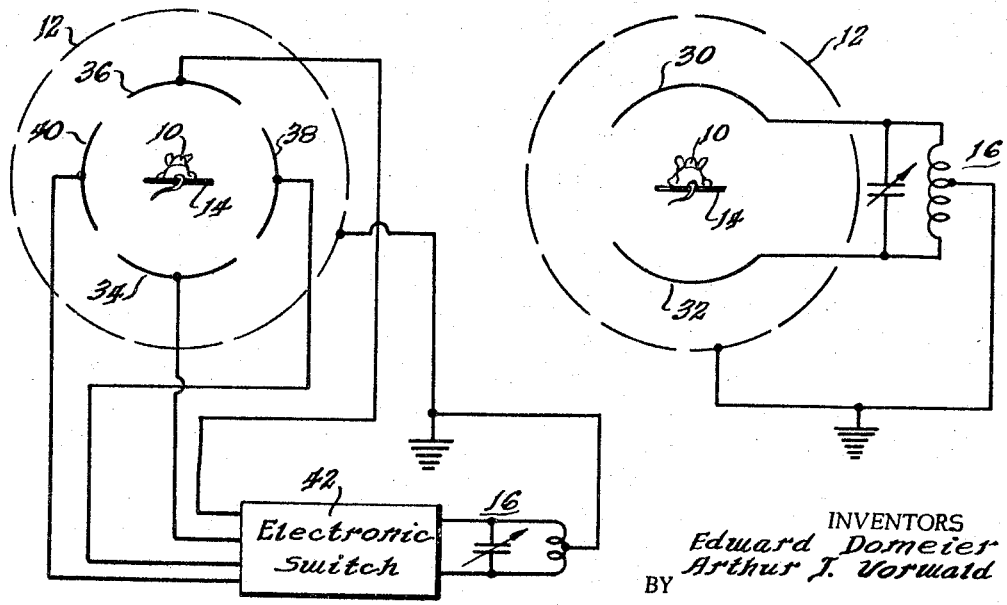
INVENTORS
Edward Domeier
Arthur J. Vorwald
BY
Roland A. Anderson
Attorney June 13, 1967  E. DOMEIER ET AL  3,324,848
CAPACITANCE RESPIROMETER
Filed Jan. 10, 1964  3 Sheets-Sheet 2
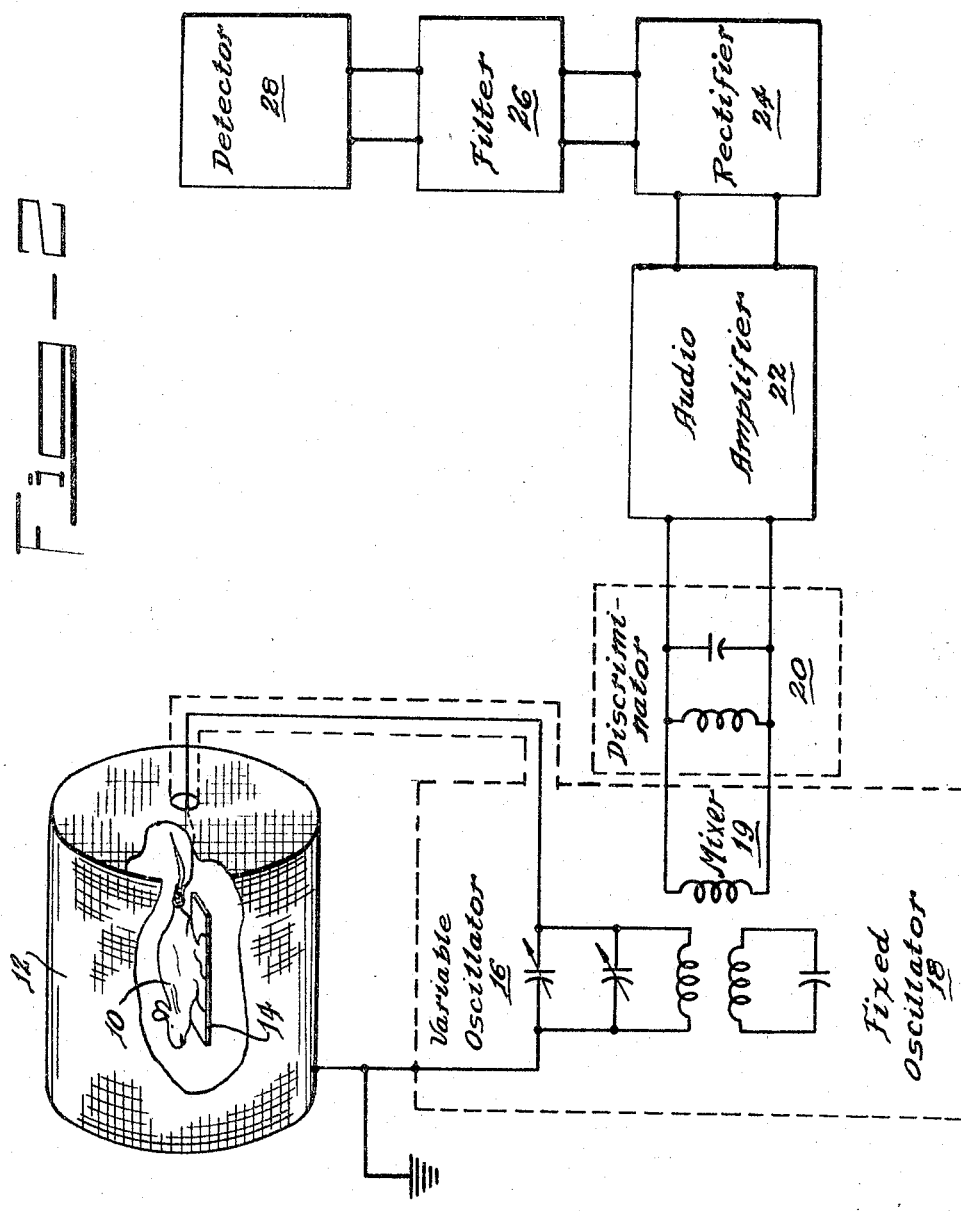
INVENTORS
Edward Domeier
Arthur J. Vorwald
BY
Attorney

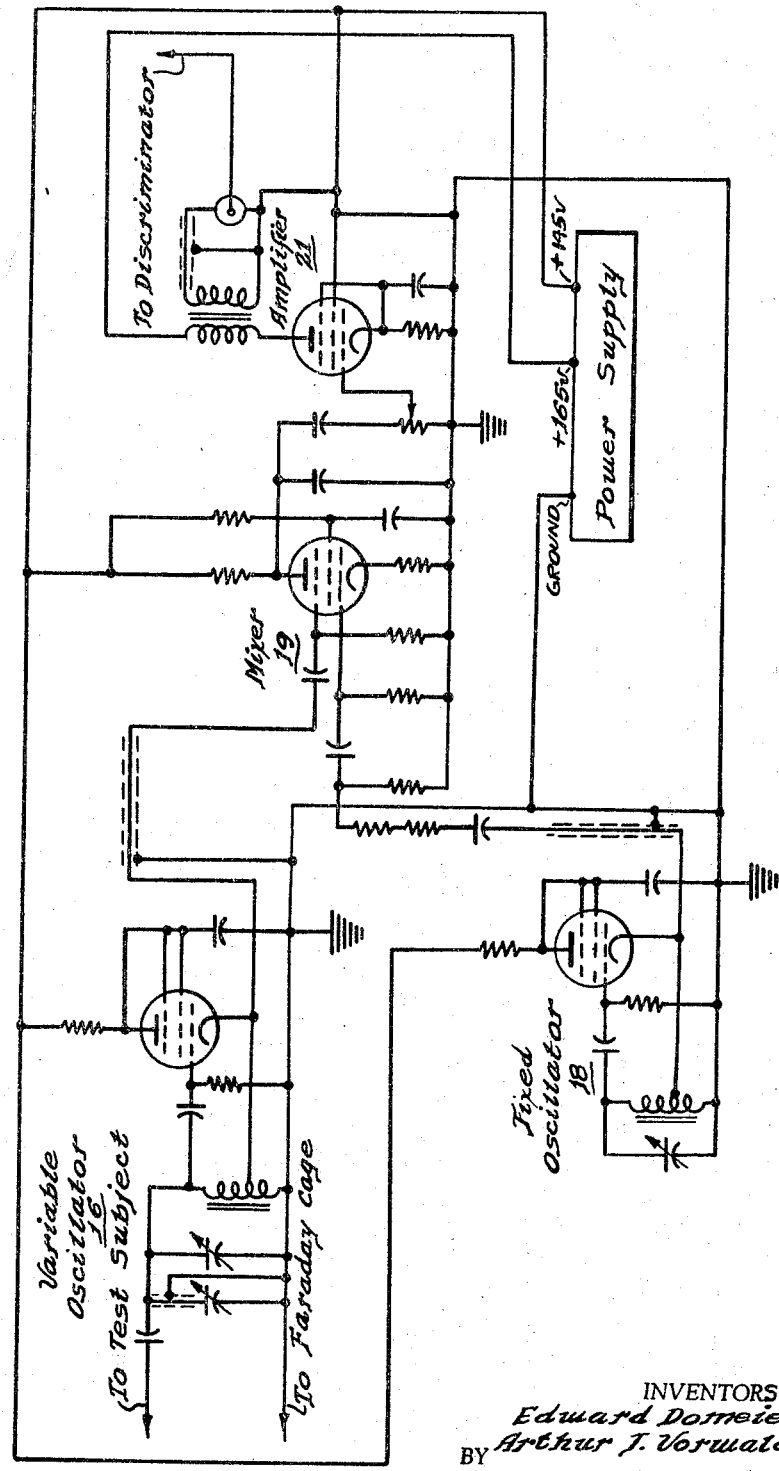

United States Patent Office 3,324,848
Patented June 13, 1967

3,324,848
CAPACITANCE RESPIROMETER
Edward Domeier and Arthur J. Vorwald, Detroit, Mich., assignors to the United States of America as represented by the United States Atomic Energy Commission
Filed Jan. 10, 1964, Ser. No. 337,113
4 Claims. (Cl. 128—2.08)

ABSTRACT OF THE DISCLOSURE

A capacitance respirometer having the body of the test animal together with an electrode form the plates of a capacitor. A variable oscillator, incorporating this capacitor in its tank circuit, provides a frequency output proportional to changes in the capacitance of the capacitor, which frequency changes when measured provide a measure of the pulmonary function of the test animal.

Contractual origin of the invention

The invention described herein was made in the course of, or under, a contract with the United States Atomic Energy Commission.

This invention relates to respirometers, and more particularly to a respirometer using electrical capacitance as a means to measure the pulmonary function of a test animal or human subject, in terms of air volume changes which accompany each inhalation and exhalation of the breathing cycle in unit period of time.

Present measurements of the respiratory function of animals are accomplished using devices such as mouth pieces, air tubes, spirograms, and enclosed boxes such as the plethysmograph. These devices are undesirable in that they frequently impose a psychic and functional disturbance on the test subject, thereby affecting the measurements obtained.

It is therefore the object of the present invention to provide a device whereby the respiratory function of an animal may be measured with a minimum of psychic and functional disturbance on the test subject and with a high degree of validity.

Other objects will become more apparent as the detailed description proceeds.

In general the present invention comprises a Faraday cage with means for spatially mounting the test subject within the cage. Electrical connections are made to the Faraday cage and the test subject so that the body surface of the test subject and the walls of the Faraday cage form plates of a capacitor. Means are provided for measuring and recording the capacitance changes induced by the continuous variation in body surface area of the walls of the Faraday cage. These changes represent a measure of the pulmonary function of the test subject.

Further understanding of the present invention will best be obtained from consideration of the accompanying drawings in which FIGURE 1 is a sketch of a Faraday cage showing the test subject mounted therein.

FIGURE 2 is a block diagram showing the preferred embodiment for the practice of the present invention.

FIGURE 3 is a schematic diagram of the oscillator circuits for the embodiment of FIGURE 2.

FIGURE 4 is a sketch of an alternate embodiment for the device of FIGURE 1.

FIGURE 5 is a sketch of a second alternate embodiment for the device of FIGURE 1.

In all lung breathers, each respiratory movement corresponds to a proportional increase or decrease in body surface area. The continuous summation of all of these surface area alterations is recorded in the form of a curve which reflects the changes of volume produced by respiration.

As shown in FIGURE 1, the test subject 10 (for purposes of illustration a rat is used) is spatially mounted within a Faraday cage 12. The mounting is effected by suspending a wide mesh nylon net 14 within the cage 12 and placing the test subject 10 unrestrained thereon. The Faraday cage 12 together with the test subject 10 in the center thereof may thus be regarded as a reactive capacitor and a pure resistor in series, the body surface of the test subject 10 and the walls of the Faraday cage 12 forming the plates of the capacitor.

The Faraday cage 12 and an extremity of the test subject 10 (such as a tail, arm or leg) are connected to the tank circuit of a variable oscillator 16 as shown in FIGURE 2, thereby becoming a contributing element to the capacitance of the variable oscillator 16. Thus every change in the capacitance between the Faraday cage 12 and the test subject 10, as caused by respiration of the subject 10, causes a frequency change in the variable oscillator 16. The output of the fixed oscillator, 18, is mixed with the output of the variable oscillator, 16, in mixer 19, as shown in detail in FIGURE 3, to produce a beat frequency (a frequency differential) output therebetween. The beat frequency output is amplified by amplifier 21 and then transformed by a frequency discriminator 20, shown in FIGURE 2, into amplitude changes which are then amplified by amplifier 22. The signal, now amplitude modulated in the rhythm of the respiratory cycle, is then converted into a D-C voltage by rectifier 24 and demodulated by a filter 26. The output of the filter 26 is a D-C voltage having amplitude modulations responsive to the test subject's respiratory movements. These modulations may then be measured by a suitable detector 28 such as an oscilloscope or pen recorder.

As previously mentioned, the Faraday cage 12 with the test subject 10 in its center may be regarded as a reactive capacitor and a pure resistor in series. Component parts of the pure resistor are the contact resistance of the skin electrode and the internal resistance of the test subject 10. A faulty measurement will result if the distance between the plates of the capacitor (the surface of the test subject 10 and the Faraday cage 12) becomes, at any employed measuring frequency, small enough to produce a capacitance value so large as to possess a reactance approaching the order of magnitude of the two pure resistances. Thus, the pure resistances must remain negligible in comparison to the reactance of the capacitor formed by the test subject 10 and the Faraday cage 12.

Using a rat as a test sample, the frequency of the variable oscillator 16 was 200 kilocycles, with normal breathing of the rat causing a variation therein of 1-3 cycles. The fixed oscillator was set at 199.7 kilocycles to produce beat frequency of 300 cycles having a 1-3 cycle variation therein from the rat's normal breathing. It was found that no experiment error existed for capacitance to resistance values if, with the rat at the center of the Faraday cage, the cage had a diameter at least 65 cm. With this size cage, it was possible to add 20-30 kilohms of resistance to the rat's tail terminal before an effect on the measured values became discernible.

Though the above example utilizes a rat, it is to be understood that the invention is usable, and has been used, with other lung breathers, including humans, dogs and rabbits. For a human, the Faraday cage should be approximately an 8-foot cube. Using the embodiment of FIGURE 2, a standard error of mean volume ranging from 0.015 to 0.008 was found in each test animal, indicating a high degree of validity.

It is to be understood that the present invention should not be limited to the capacitance generating structure shown in FIGURE 1. Alternate embodiments therefore are shown in FIGURES 4 and 5.

In FIGURE 4, the test subject 10 is spatially disposed, electrically unconnected, between two high frequency plate electrodes 30 and 32 which in turn are spatially mounted within the Faraday cage 12. The electrodes 30 and 32 are contoured so that their curvature is similar to that of the Faraday cage 12. The capacitance measuring circuit used in cooperation with the embodiment of FIGURE 4 is the same as used with the embodiment of FIGURE 1 except that the variable oscillator 16 is constructed as a balanced variable oscillator as shown in representative form in FIGURE 4. The Faraday cage 12 is grounded and connected to the impedance center of the tank circuit of the balance variable oscillator 16 which center is also at ground potential. The electrodes 30 and 32 are connected across the tank circuit whereby a differential capacitive input to the balanced oscillator 16 is achieved.

In the embodiment of FIGURE 4, the Faraday cage 12 is used to screen the system from external disturbances and to eliminate the emittance of high frequency radiation. Thus, it is grounded and connected to the impedance center of the tank circuit of the balanced variable oscillator 16. The measurement of capacitance is accomplished through changes in the body surface volume of the breathing test subject 10 as they affect the capacitance between electrodes 30 and 32. The test subject 10, in complete isolation between the electrodes 30 and 32, may be regarded as part of the conducting medium in the electrical field of the electrodes 30 and 32, and two electrodes 30 and 32 constituting a capacitor in the balanced variable oscillator 16.

In FIGURE 5, the test subject 10, again electrically unconnected, is spatially disposed between the four high frequency curved plate electrodes 34, 36, 38 and 40 which in turn are spatially mounted within the Faraday cage 12 as shown. The Faraday cage 12 is grounded and, as in the embodiment of FIGURE 4, connected to the grounded impedance center of the tank circuit of the balanced variable oscillator 16. A conventional electronic switch 42 is used to alternately switch opposing pairs of electrodes 34, 36, 38 and 40 across the tank circuit of the balanced variable oscillator 16. The capacitance measuring circuit used in cooperation with the embodiment of FIGURE 5 is the same as used with the embodiment of FIGURE 1 except that the variable oscillator 16 is constructed as a balanced variable oscillator as shown in representative form in FIGURE 5.

As in the embodiment of FIGURE 4, the Faraday cage of FIGURE 5 acts as a screen against external influences and to eliminate the emittance of high frequency radiation. In the embodiment of FIGURE 5, a higher degree of independence from the test subject's external body shape is achieved over the other embodiments since by alternating pairs of electrodes, the test subject behaves as though it were a geometric point within the electric field between the electrodes 34, 36, 38 and 40.

Persons skilled in the art will, of course, readily adapt the teachings of the invention to embodiments far different from the embodiments illustrated. Accordingly, the scope of the protection afforded the invention should not be limited to the particular embodiments thereof shown in the drawings and described above but shall be determined only in accordance with the appended claims.

The embodiments of the invention in which an exclusive property or privilege is claimed are defined as follows:

1. A device for measuring the respiratory function of an animal comprising a Faraday cage, means for spatially mounting said animal within said cage, an even plurality of electrodes spatially disposed around said animal and within said Faraday cage, means for connecting opposing pairs of said electrodes so that each pair forms the plates of a capacitor, a balanced variable oscillator, means for sequentially connecting each of said formed capacitors across the tank circuit of said balanced variable oscillator, means for connecting said Faraday cage to the impedance center of the tank circuit of said balanced oscillator, a fixed oscillator, means for mixing the output of said fixed and balanced variable oscillator to provide a difference frequency therebetween, discriminating means for amplitude modulating the output of said mixing means responsive to frequency changes therein, means for rectifying the output of said discriminating means, filtering means for demodulating the output of said rectifier means and means for detecting the demodulated output of said filtering means.

2. A device for measuring the respiratory function of an animal comprising a Faraday cage, means for spatially mounting said animal within said cage so that the walls of said cage and the body surface of said animal form plates of a capacitor, the size of said Faraday cage and said animal being such that the capacitive reactance therebetween is greater than the sum totals of the skin resistance and the internal resistance of said animal, and means for mesauring variations in capacitance induced by changes in the body surface of said animal, which variations are a measure of the respiratory function of said animal.

3. The device according to claim 2 wherein said capacitance measuring means comprise a variable oscillator having the tank circuit thereof connected across the capacitance formed by said animal and said Faraday cage, the output of said variable oscillator being frequency responsive to changes in the capacitance formed by said animal and said Faraday cage, a fixed oscillator, means for mixing the ouputs of said fixed and varable oscillators to provide a difference frequency therebetween, discriminating means for amplitude modulating the output of said mixing means responsive to frequency changes therein, means for rectifying the output of said discriminating means, filtering means for demodulating the output of said rectifier means and means for detecting the demodulated output of said filtering means.

4. A device for measuring the respiratory function of an animal comprising a Faraday cage, means for spatially mounting said animal within said cage, two electrodes spatially disposed around said animal and within said Faraday cage, means for connecting said electrodes so that they form the plates of a capacitor, a balanced variable oscillator including a tank circuit having an impedance center, means for connecting the tank circuit of said balanced variable oscillator across said electrodes, means for connecting said Faraday cage to the impedance center of the tank circuit of said balanced oscillator, the output of said balanced variable oscillator being frequency responsive to changes in capacitance between said electrodes, a fixed oscillator, means for mixing the output of said fixed and balanced variable oscillators to provide a difference frequency therebetween, discriminating means for amplitude modulating the output of said mixing means responsive to frequency changes therein, means for rectifying the output of said discriminating means, filtering means for demodulating the output of said rectifier means and means for detecting the demodulated output of said filtering means.

(References on following page)

References Cited

UNITED STATES PATENTS

| | | | |
|---|---|---|---|
| Re. 22,258 | 1/1943 | Mittelmann | 128—413 X |
| 2,025,719 | 12/1935 | Blau | 128—2.1 X |
| 2,970,041 | 1/1961 | Burlis et al. | 128—2.07 X |

FOREIGN PATENTS 566,752  4/1958  Belgium.

OTHER REFERENCES

Impedance Respirometer by McCall in Am. Journal of Medical Electronics for October–December 1963, pp. 322, 327.

Measurement by Geddes in Am. Journal of Medical Electronics for April–June 1964, pp. 16–27.

RICHARD A. GAUDET, *Primary Examiner.*

SIMON BRODER, *Examiner.*